(12) United States Patent
Hayes

(10) Patent No.: US 6,472,626 B2
(45) Date of Patent: Oct. 29, 2002

(54) KEYBOARD OVERLAY

(75) Inventor: Christopher J. Hayes, West Falls, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/920,609

(22) Filed: Aug. 1, 2001

(65) Prior Publication Data

US 2002/0056612 A1 May 16, 2002

Related U.S. Application Data

(60) Provisional application No. 60/223,455, filed on Aug. 2, 2000.

(51) Int. Cl.$^7$ ............................ H01H 3/20; A47G 29/00
(52) U.S. Cl. ........................ 200/333; 200/330; 200/5 A; 235/145 R; 248/694
(58) Field of Search ................................. 150/154, 165; 200/5 A, 333, 330, 332.1; 235/145 R; 248/205.2, 500, 505, 510, 680, 506, 459, 694, 918, 690, 205.1, 692; 273/241; 341/22, 23; 345/156, 168; 361/680–683, 686; 400/472, 473; 446/141, 143, 227, 408; 463/37, 47

(56) References Cited

U.S. PATENT DOCUMENTS

| | | | |
|---|---|---|---|
| 4,066,850 A | * 1/1978 | Heys, Jr. | ................ 200/293 |
| 4,158,130 A | 6/1979 | Speraw et al. | ............... 235/146 |
| 4,297,044 A | 10/1981 | Hornberg et al. | ........... 400/473 |
| 4,575,591 A | 3/1986 | Lugaresi | ..................... 200/6 A |
| 4,704,940 A | 11/1987 | Cummings | .................. 84/425 |
| 4,786,768 A | 11/1988 | Langewis et al. | ........... 200/6 A |
| 5,141,343 A | 8/1992 | Roylance et al. | ........... 400/472 |
| 5,214,429 A | 5/1993 | Greenberger | ................. 341/22 |
| 5,514,855 A | 5/1996 | Sullivan | ................. 235/145 R |
| 5,640,179 A | 6/1997 | Lake | .......................... 345/161 |
| 5,667,319 A | 9/1997 | Satloff | ....................... 400/472 |
| 5,894,406 A | 4/1999 | Blend et al. | ................. 361/680 |
| 5,971,635 A | 10/1999 | Wise | ......................... 400/473 |
| 5,992,817 A | 11/1999 | Klitsner et al. | ............. 248/694 |
| D430,233 S | 8/2000 | Liebowitz et al. | ......... D21/515 |
| D430,234 S | 8/2000 | Liebowitz et al. | ......... D21/515 |
| D430,235 S | 8/2000 | Liebowitz et al. | ......... D21/515 |
| 6,209,845 B1 | 4/2001 | Klitsner et al. | ............. 248/694 |
| 6,285,299 B1 | 9/2001 | King-DeBaum | ............. 341/23 |
| 6,322,449 B1 | 11/2001 | Klitsner et al. | ............... 463/37 |

* cited by examiner

*Primary Examiner*—Michael Friedhofer
(74) *Attorney, Agent, or Firm*—Kolisch Hartwell Dickinson McCormack & Heuser

(57) ABSTRACT

A keyboard overlay that may be adjusted to fit over a variety of keyboards. The overlay is self-supporting so that potential damage to the keyboard is limited, and requires no straps or other retaining devices so that removal and replacement of the overlay is simple. It is particularly intended for use by young children. The overlay includes a support having telescoping crossbeams configured to permit adjustments for keyboards of varying sizes.

26 Claims, 3 Drawing Sheets

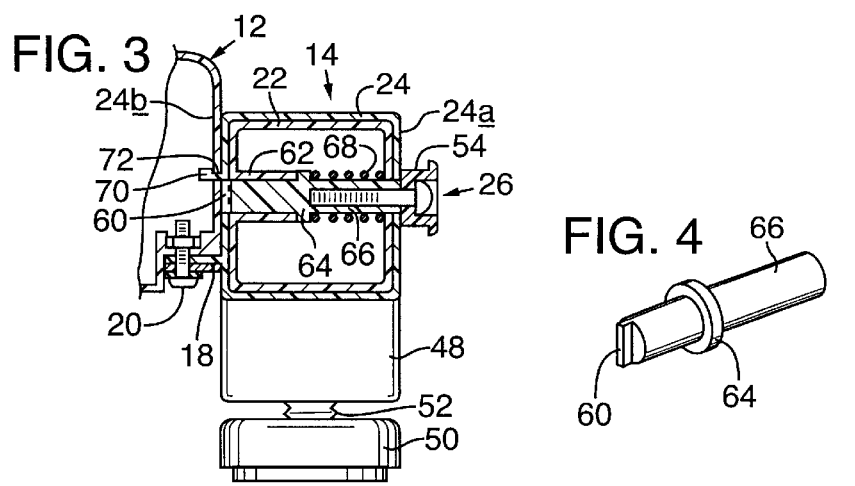
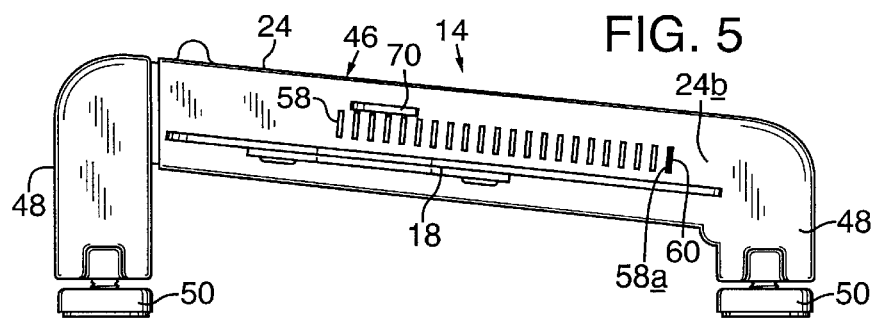
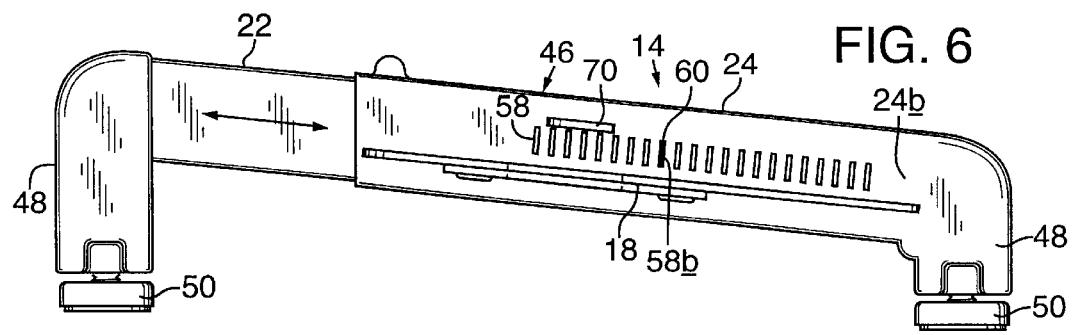

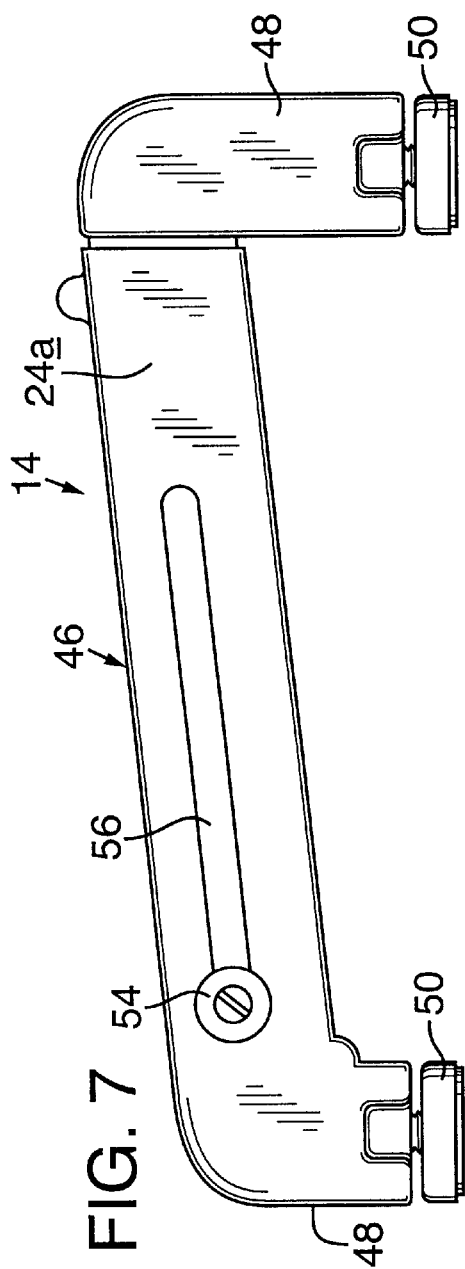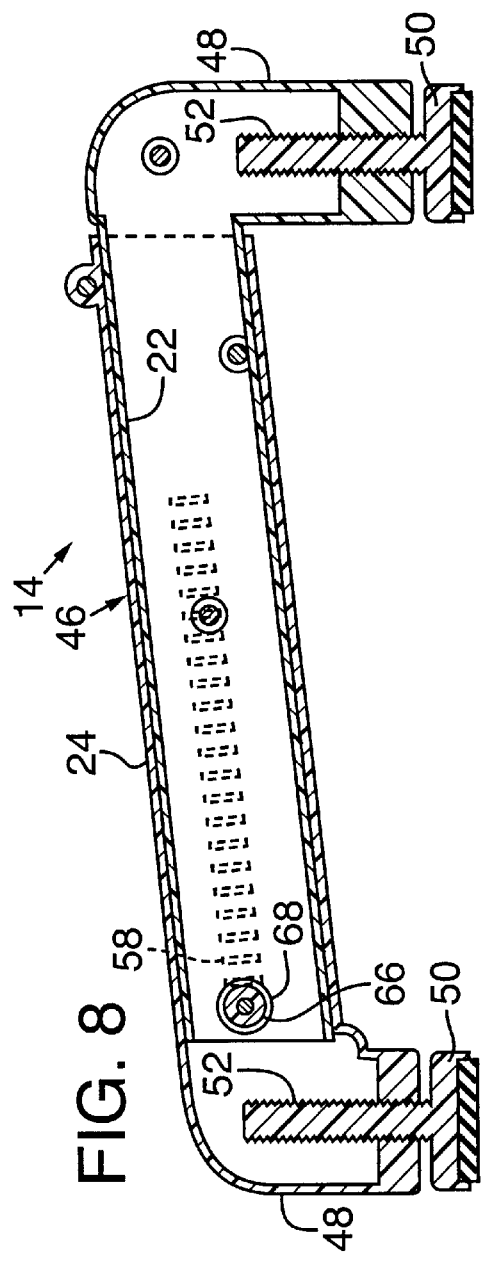

KEYBOARD OVERLAY

CROSS-REFERENCE TO RELATED APPLICATIONS

This application is based upon and claims priority under 35 U.S.C. §119(e) to the following U.S. provisional patent application, which is incorporated herein by reference in its entirety for all purposes: Ser. No. 60/223,455, entitled "Keyboard Overlay," filed Aug. 2, 2000.

BACKGROUND OF THE INVENTION

Keyboard overlays to ease operation of keyboards are well known in the art. Keyboard overlays have been used to ease operation of portable laptop type computers. Additionally, keyboard overlays have been used to simplify the interface with a computer so younger less sophisticated users may interact with the computer. Various keyboard overlays are shown in U.S. Pat. Nos. 4,786,768, 5,514,855, 5,667,319, 5,894,406 and 5,992,817, the disclosures of which are incorporated herein by reference.

SUMMARY OF THE INVENTION

The present invention relates generally to keyboard overlays, and more particularly to a keyboard overlay that may be adjusted to match a particular keyboard, and then removed and replaced at will. The overlay is self-supporting so that potential damage to the keyboard is limited. The overlay also requires no straps or other retaining devices so that removal and replacement of the overlay is simple. It is particularly intended for use by young children.

The advantages of the present invention will be understood more readily after a consideration of the drawings and the Detailed Description.

BRIEF DESCRIPTION OF THE DRAWINGS

FIG. 3 is cross-sectional view taken along line 3—3 of the overlay of FIG. 2, showing a support assembly attaching a body of the keyboard overlay.

FIG. 4 is an isometric view of a retainer mechanism of the present invention.

FIG. 5 is a side view of the support assembly of FIG. 3.

FIG. 6 is a side view of the support assembly of FIG. 5, shown telescopically extended.

FIG. 7 is a side view of the support assembly of FIG. 5, shown from the opposite side.

FIG. 8 is a cross-sectional view of the support assembly FIG. 1, taken along line 8—8.

DETAILED DESCRIPTION AND BEST MODE OF THE INVENTION

Figure 1:
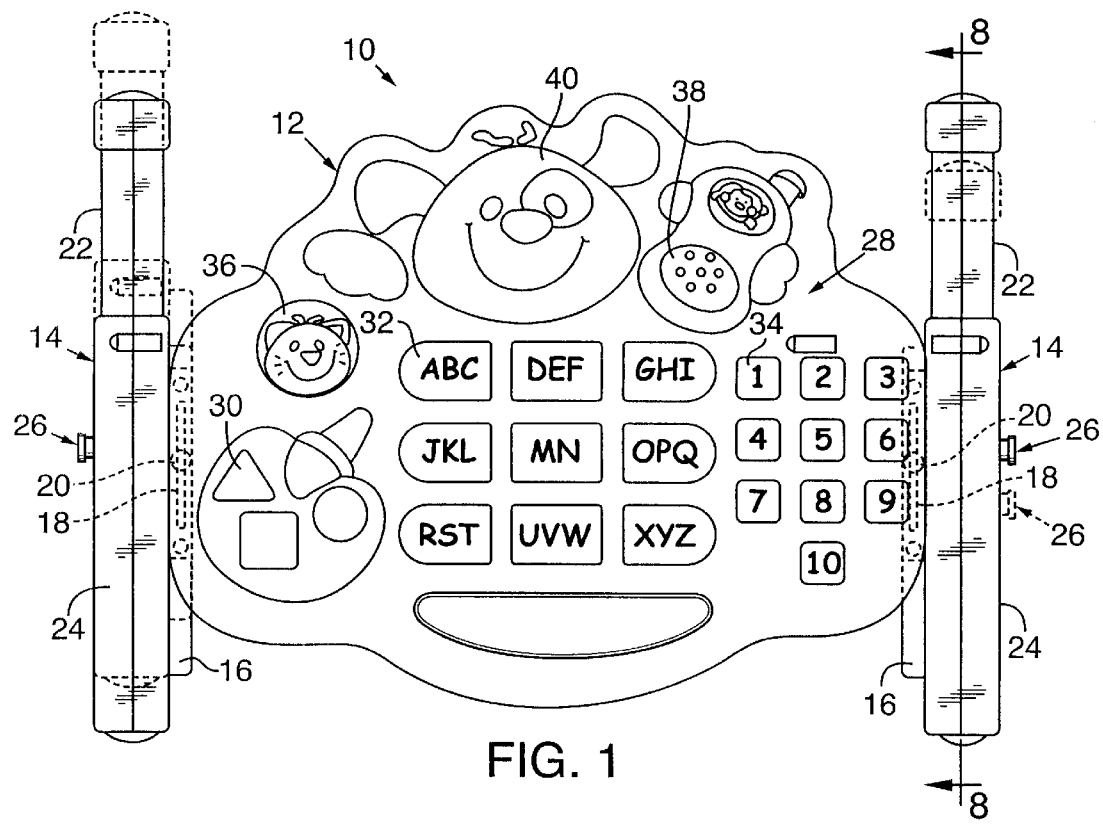
FIG. 1 is a top view of a keyboard overlay according to the present invention.

Turning initially to FIG. 1, a keyboard overlay according to one embodiment of the present invention is generally indicated at 10. Overlay 10 includes a body 12 and a support assembly 14. In the depicted embodiment, two support assemblies 14 are shown.

Support assemblies 14 are adjustably connected to body 12 by a first support assembly tab 16. First support assembly tab 16 includes a tab slot 18 through which a screw 20 secures support assembly 14 to body 12. An additional second support assembly tab helps secure support assembly 14 to body 12, as will be discussed below.

Support assembly 14 may move relative to body 12, as shown, on the left side of FIG. 1, in dashed lines. To move support assembly 14 relative to body 12, a user loosens screw 20 and slides support assembly 14 in the desired direction. Once repositioned, the user retightens screw 20 to secure support assembly 14 relative to body 12.

Support assembly 14 adjusts still further by extending and retracting an inner section 22 out of an outer section 24. Retraction of inner section 22 into outer section 24 is shown on the right side of FIG. 1. A retainer mechanism 26 secures inner section 22 relative to outer section 24, thereby preventing extension or retraction, as will be explained in detail below.

Body 12 includes a plurality of keys 28 configured to actuate a key on an underlying keyboard when depressed, as will be discussed below. Plurality of keys 28 may be arranged into various groups; as shown, such as a group of geometrically shaped keys 30, a group of alphabetically arranged keys 32, and a group of numerically arranged keys 34. Body 12 also includes a rotating actuator 36, which actuates a key on the underlying keyboard when rotated. Similarly, a textured key 38 is included on body 12 and when depressed actuates a key on the underlying keyboard. Body 12 may also include an ornamental design, as illustrated at 40. Keys 28 are arranged in groups 30, 32, and 34 to make interaction with a computer simpler for young children.

Figure 2:
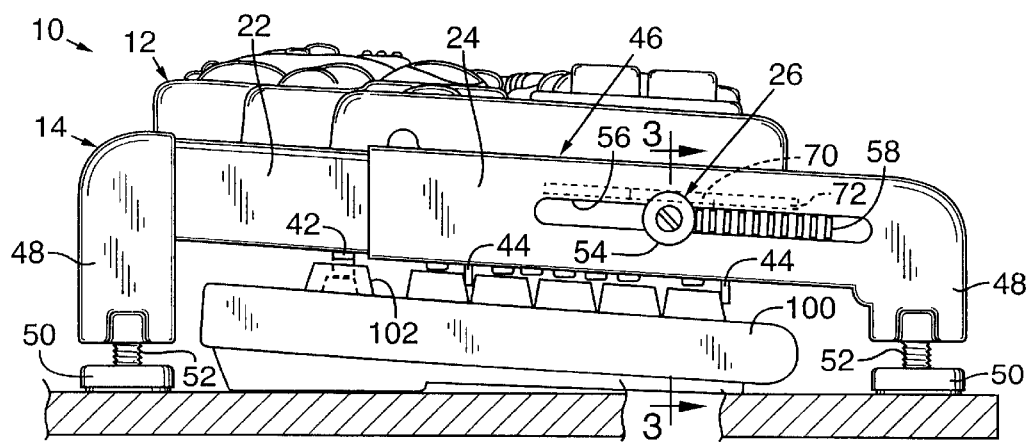
FIG. 2 is a side view showing the keyboard overlay of FIG. 1, positioned over a keyboard.

Turning to FIG. 2, overlay 10 is configured for positioning above an underlying computer keyboard 100. A series of actuators 42 extend from the bottom of body 12 and are configured to depress keyboard keys 102, as shown in dashed lines in FIG. 2. Proper alignment may be obtained through alignment mechanisms 44. Alignment mechanisms 44 extend downward from the bottom of body 12 and are configured to position body 12 relative to keys 102 of keyboard 100. When body 12 is properly aligned with keyboard 100, overlay 10 will function correctly. Overlay 10 is functioning correctly when depressing one of keys 28 actuates the appropriate key 102 on keyboard 100.

Additionally, in FIG. 2, support assembly 14 is shown in more detail. Support assembly 14 includes a telescoping crossbeam 46, which interconnects a pair of legs 48. Legs 48 have feet 50 and are vertically adjustable by threaded shafts 52. Telescoping crossbeam 46 may be formed from inner section 22 and an outer section 24. As previously discussed, inner section 22 is sized to fit within the inner diameter of outer section 24, so that inner section 22 and outer section 24 may slide relative to one another extending and retracting the length of crossbeam 46.

Retainer mechanism 26 is configured to secure inner section 22 and outer section 24 in a fixed position. Retainer mechanism 26 includes a handle 54, which is configured to withdraw the retainer mechanism when pulled. A user may release inner section 22 from outer section 24 for relative telescopic motion by pulling handle 54.

A retainer mechanism slot 56 permits sliding of retainer mechanism 26 and handle 54, within a range of motion. The range of motion may be defined by the length of slot 56. A series of recesses 58 are positioned along a wall opposite slot 56 in outer section 24, as will be discussed further below. Recesses 58 provide for discrete positions at which telescopic movement between inner section 22 and outer section 24 may be securely fixed.

As discussed above, inner section 22 is sized to fit within outer section 24, as shown in FIG. 3. Outer section 24 includes a first wall 24a and a second wall 24b spaced apart from one another. Retainer mechanism 26 passes through slot 56 in first wall 24a of outer section 24. Retainer mechanism 26 includes a detent end 60 configured to engage recesses 58, which may be positioned along wall 24b of outer section 24. Inner section 22 includes an alignment sleeve 62 for aligning detent end 60 of retainer mechanism 26, while retainer mechanism 26 is being inserted or withdrawn.

Retainer mechanism 26 includes a stop collar 64, positioned adjacent detent end 60. Stop collar 64 abuts alignment sleeve 62 when retainer mechanism 26 is engaged.

Retainer mechanism 26 further includes a retainer shaft 66 adjacent stop collar 64. Retainer shaft 66 may be sized to accommodate a biasing member 68, as shown in FIG. 3. Biasing member 68 may be a spring or other suitable resilient material. Biasing member 68 may be configured to bias detent end 60 of retainer mechanism 26 into engagement with one of recesses 58.

Handle 54 is coupled with retainer shaft 66. As noted above, handle 54 may be configured for withdrawing retainer mechanism 26, permitting crossbeam 46 to move telescopically. Handle 54 may be coupled with retainer shaft 66 by a screw or other suitable attachment means.

A cross-section showing crossbeam 46 and its attachment to body 12 is shown in FIG. 3. Body 12 includes an alignment guide slot 72 configured to receive a second support assembly tab 70. Second support assembly tab 70 is positioned on support assembly 14 to insert into alignment guide slot 72 in body 12. Tab 70 may have an upturned end to secure the tab within slot 72. As noted above, support assembly 14 is also secured to body 12 by screw 20, which may be tightened into body 12 through slot 18 of first support assemble tab 16, thus securing support assembly 14 to body 12.

Turning briefly to FIG. 4, as indicated above, retainer mechanism 26 includes detent end 60 adapted to engage recesses 58. Retainer mechanism 26 also includes stop collar 64 adapted to abut alignment sleeve 62 and provide a shoulder against which biasing member 68 acts. Retainer shaft 66 extends from collar 64 through wall 24a of outer section 24 and may be configured to receive handle 54.

Turning to FIG. 5, it can be seen that recesses 58 are positioned along wall 24b of outer section 24. As noted above, recesses 58 define the discrete positions at which inner section 22 and outer section 24 may be fixed relative to one another. Detent end 60 of retainer mechanism 26 is positioned to secure inner section 22 from moving relative to outer section 24, as shown at discrete recess 58a. When detent 60 is engaged with recess 58a crossbeam 36 is fully retracted, having the shortest length within its range of motion.

Turning to FIG. 6, pulling handle 54 disengages, or withdraws, detent end 60 from recess 58a and permits telescopic extension of crossbeam 36. After extension of crossbeam 36, releasing handle 54 reengages detent 60 with one of the discrete recesses 58, as shown at 58b. In FIG. 6 crossbeam 46 has been extended to accommodate keyboard 100. In this manner, crossbeam 46 may be adjusted in length, and may be both extended and retracted.

Turning to FIG. 7, it may be seen that handle 54 may be configured to slide along retainer mechanism guide slot 56 in crossbeam 46 of support assembly 14, as discussed above. Guide slot 56 may be positioned on wall 24a of crossbeam 46. Guide slot 56 permits retainer mechanism 26 to move perpendicular to wall 24a. The length of guide slot 56 defines the maximum range of motion that crossbeam 46 may telescopically extend and retract.

Turning to FIG. 8, a cross-sectional view of support assembly 14 is shown, cross-sectioned along line 8—8 of FIG. 1. Legs 48, as noted above, may be adjusted vertically through the use of threaded shafts 52. To raise body 12 of keyboard overlay 10, feet 50 may be rotated counter clockwise. Similarly, to lower body 12, feet 50 may be rotated clockwise. In this manner, the vertical position of keyboard overlay 10 above keyboard 100 may be optimized.

In summary, keyboard overlay 10 may be positioned over computer keyboard 100 by adjustment of support assemblies 14. Crossbeams 46 may be extended and retracted by releasing retainer mechanism 26, to position support assemblies 14 horizontally over keyboard 100. Mechanism 26 may be released by pulling handle 54. Pulling handle 54 withdraws detent end 60 from one of the set of recesses 58. Withdrawal of detent end 60 releases inner section 22 and outer section 24 for motion relative to one another. Support assemblies 14 may be adjusted vertically over keyboard 100 by adjusting the height of threaded shafts 52. Once all the adjustments in position have been completed, the overlay easily sets over keyboard 100 and may be placed and removed with little effort.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. An overlay for a computer keyboard comprising:
   a body having elongate slots; and
   a support assembly including a tab inserted into one of the elongate slots in the body; wherein:
   the tab may slide within the slot, thereby defining a range of motion for the support assembly; and
   the support assembly may be secured at a selectable position within the range of motion for the support assembly, thus allowing the position of the support assembly to be changed relative to the body.

2. The overlay of claim 1, wherein the support assembly further comprises:
   a pair of spaced-apart legs; and
   a telescopically adjustable crossbeam that can be repositioned relative to the body extending between the legs.

3. The overlay of claim 2, wherein the telescopically adjustable crossbeam is generally horizontal and includes an inner section and an outer section.

4. The overlay of claim 2, wherein the length of the legs is adjustable for changing the vertical position of the body relative to a computer keyboard.

5. The overlay of claim 3, wherein:
the inner section of the telescoping crossbeam is adjustable relative to the outer section within a predefined range of motion; and
the position of the inner section of the telescoping crossbeam may be fixed at any one of a set of discrete positions within the predefined range of motion.

6. The overlay of claim 5, wherein the inner section of the telescoping crossbeam is fixed relative to the outer section by a retainer mechanism.

7. The overlay of claim 6, wherein the retainer mechanism:
is coupled with the inner section;
is configured to secure the inner section relative to the corresponding outer section;
includes a detent end for engaging a set of discrete positions defined by recesses along a first wall of the corresponding outer section;
includes a biasing member positioned to urge the detent into one of the recesses; and
includes a handle extending through a slot in a second wall of the outer section, the slot in the second wall being opposed to the recesses in the first wall.

8. The overlay of claim 7, wherein the detent end of the retainer mechanism extends laterally into one of the recesses and is retracted laterally from the same recess by pulling on the handle.

9. The overlay of claim 1, wherein the body includes a plurality of keys.

10. The overlay of claim 9, wherein the plurality of keys includes a set of keys having an alphabetic layout.

11. The overlay of claim 9, wherein the plurality of keys includes a set of keys having a numeric layout.

12. The overlay of claim 9, wherein the plurality of keys includes a set of geometric shaped keys.

13. The overlay of claim 1, further including a rotating actuator configured to transmit rotating motion of the actuator into a corresponding keystroke on an underlying keyboard.

14. An overlay for a computer keyboard comprising:
a body; and
at least two support assemblies coupled with the body, each support assembly including legs interconnected by a telescoping crossbeam having an inner section and an outer section that slide relative to each other, wherein the support assemblies are configured to be selectively movable relative to the body to accommodate computer keyboards of different sizes.

15. The overlay of claim 14, wherein the telescoping crossbeams are generally horizontal.

16. The overlay of claim 14, wherein the length of the legs is adjustable for changing the vertical position of the body relative to a computer keyboard.

17. The overlay of claim 14, wherein the inner section of each telescoping crossbeam may be fixed in a position relative to the corresponding outer section at any one of a set of discrete positions.

18. The overlay of claim 17, further comprising a retainer mechanism to releasably fix the inner section of each of the telescoping crossbeams relative to the corresponding outer section.

19. The overlay of claim 18, wherein:
the outer section of each crossbeam further comprises:
a set of recesses along a first wall of the outer section; and
a slot along a second wall of the outer section opposed to the first wall; and
the retainer mechanism further comprises:
a detent end for engaging one of the set of recesses along the first wall of the outer section;
a biasing member positioned to urge the detent into one of the recesses; and
a handle extending through the slot in the second wall of the outer section.

20. The overlay of claim 19, wherein the detent end of the retainer mechanism extends laterally into one of the recesses and is retracted laterally from the same recess by pulling on the handle.

21. The overlay of claim 14, wherein the body includes a plurality of keys.

22. The overlay of claim 21, wherein the plurality of keys includes a set of keys having an alphabetic layout.

23. The overlay of claim 21, wherein the plurality of keys includes a set of keys having a numeric layout.

24. The overlay of claim 21, wherein the plurality of keys includes a set of geometric shaped keys.

25. The overlay of claim 14, further including a rotating actuator configured to transmit rotating motion of the actuator into a corresponding keystroke on an underlying keyboard.

26. An overlay for a computer keyboard comprising:
a body; and
a support assembly coupled with the body, the support assembly including a telescoping crossbeam having an inner section and an outer section that slide relative to each other, wherein the support assembly is configured to be selectively movable relative to the body to accommodate computer keyboards of different sizes.

* * * * *